United States Patent Office 3,098,920
Patented July 23, 1963

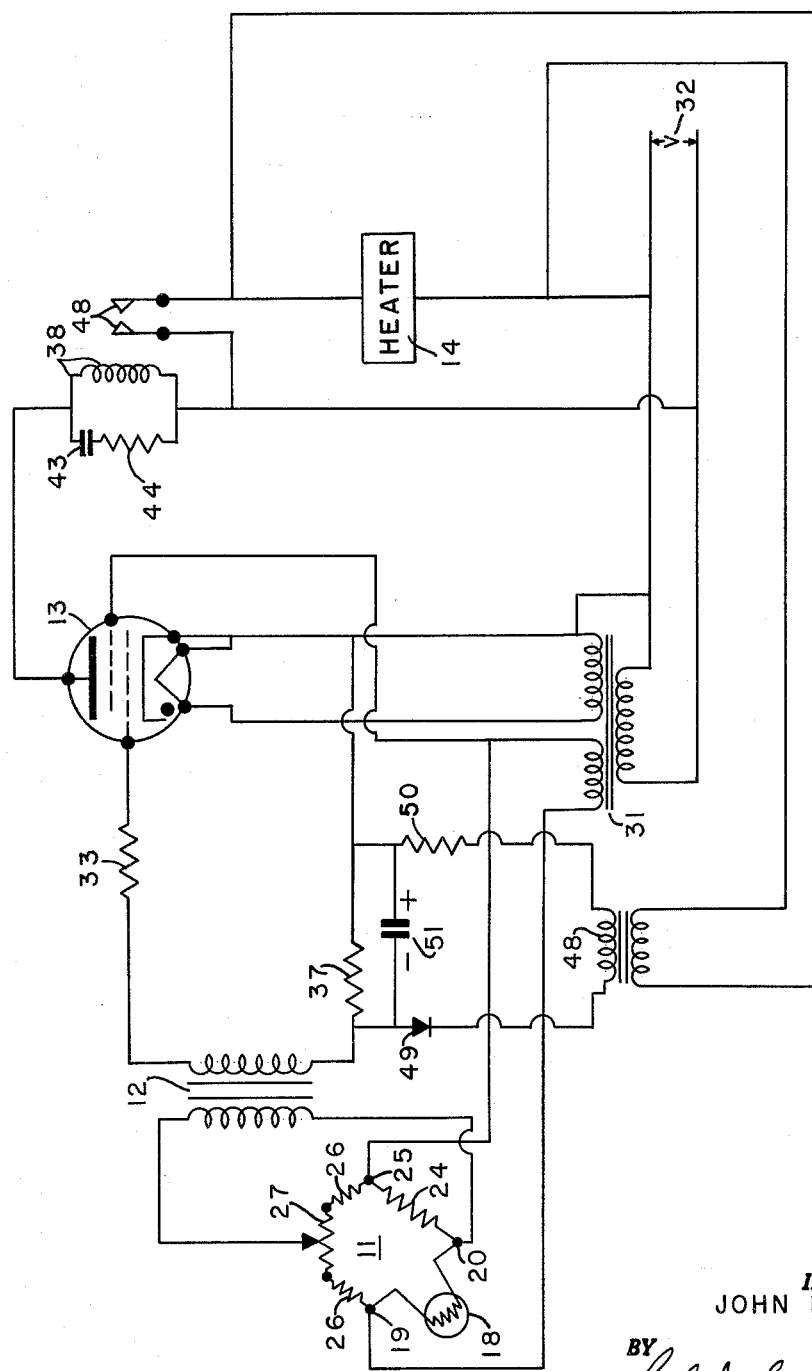

3,098,920
CONTROL CIRCUIT
John R. Bray, Pensacola, Fla., assignor, by mesne assignments, to Monsanto Chemical Company, a corporation of Delaware
Filed July 27, 1961, Ser. No. 127,192
1 Claim. (Cl. 219—20)

This invention relates to control circuits and more particularly to circuits for controlling the operation of heaters.

The process of hot drawing of nylon yarn requires an accurate control of the temperature of the pin or block across which the yarn is drawn. In this process the yarn is moved under tension across a heated pin or block and is stretched in the process. For the desired results it is necessary that the temperature of the draw pin or block be maintained accurately at a predetermined temperature.

There are numerous other operations where it is necessary to hold a temperature within limits. In some cases, the temperature range is not critical. In others, the results of the operation depend on accurate, unvarying temperatures. With this in mind, one of the objects of this invention is to provide a novel and improved control circuit.

Another object of this invention is to provide a system for controlling a heater to maintain a predetermined temperature.

A further object of this invention is to provide a system having a temperature sensing bridge adapted to control heater to maintain a predetermined temperature.

A still further object of this invention is to provide a heater control system wherein a heater operating voltage is fed back and combined with the output of a temperature sensing bridge to control the application of the voltage to the heater.

Still another object of this invention is to provide a heater control system wherein a feedback voltage is combined with a heater control signal through a time relay network.

Yet another object of this invention is to provide a heater control system wherein exponentially varying feedback signals are added to bridge output signals to give composite heater control signals.

One embodiment of the invention contemplates a heater control circuit wherein a temperature sensing bridge having a thermistor therein applies an output signal to a thyratron which conducts to apply power to a relay controlling the heater. When power is applied to the heater it is also applied through a resistor to a parallel-connected resistor and capacitor which are connected to the bridge output. The exponentially increasing voltage across the resistor opposes the bridge output signal to shut off the heater by rendering the thyratron nonconductive, whereupon the capacitor discharges through the resistor until the bridge output signal exceeds the exponentially decaying feedback signal to a point where the thyratron will again fire. This again charges up the capacitor and exponentially elevates the voltage across the resistor so that the above cycle is repeated. Thus, the heater will be rapidly turned on and off to always seek the predetermined operating temperature, thereby resulting in a highly accurate control of the heater temperature.

Other objects and advantages of the invention will become apparent when the following detailed description is read in conjunction with the appended drawing, in which the single figure shows a schematic layout of the circuit of the present invention.

Referring now in detail to the drawing, a temperature sensing network or bridge 11 acts through a coupling transformer 12 to control the operation of a tube such as a thyratron 13 which in turn controls the operation of an electric heater 14. The bridge 11 includes a thermistor 18 connected between terminals 19 and 20, a resistor 24 connected between the terminal 20 and a terminal 25, and resistors 26 and a potentiometer 27 connected in series between the terminals 19 and 25.

The thermistor 18, which is physically situated to sense the temperature of the heater 14 or the object to be heated, and the resistor 24 are connected between the terminals 19 and 25 in parallel with the resistors and the potentiometer in a well known manner. The output circuit of the bridge 11 includes the primary winding of the coupling transformer 12 and is connected between the terminal 20 and the tap of the potentiometer 27. A temperature responsive output signal flows through this circuit when the sensed temperature varies from the predetermined operating value. An A.C. input voltage is applied to the bridge terminals 19 and 25 from a secondary winding of a transformer 31 connected to an A.C. power supply 32.

One end of the secondary winding of the coupling transformer 12 is connected through a resistor 33 to the control grid of the tube 13. The other end of this secondary winding is connected through a 27K ohm "discharge" or "bias" resistor 37 to the cathode of the thyratron 13 so that output signals or pulses of the bridge 11 are applied to the control grid of the thyratron.

The plate circuit of the thyratron 13 includes a commercially available mercury displacement relay 38 connected in parallel with a capacitor 43 and a resistor 44, the resistor 44 and capacitor 43 being connected in series to smooth the operation of the relay. During positive half cycles of the power supply the capacitor 43 charges up to maintain the relay 38 in an energized state during negative half cycles of the power supply. The relay 38, when energized, closes contacts 48 to connect the heater 14 to the power supply 32.

In operation of the circuit described thus far, the thermistor 18 senses the temperature of the heater 14 or the object to be heated and varies in resistance according to the sensed temperature. If the sensed temperature is above the predetermined desired operating temperature, the thermistor will unbalance the bridge in a direction to produce in the bridge output circuit a signal having a phase which will prevent the conduction of the thyratron 13. In this case, the heater 14 is not operated.

If the sensed temperature is below that desired, the thermistor 18 will unbalance the bridge 11 in a direction to produce in the bridge output circuit a signal having a phase which will drive the thyratron 13 toward conduction to operate the heater 14.

To give the system a superior accuracy, a feedback network is utilized. A feedback transformer 48 having its primary winding connected across the heater 14 has opposite ends of its secondary winding connected through a diode 49 and a 51K ohm "charging" resistor 50 to opposite sides of the resistor 37. A 50 mfd. capacitor 51 is connected in parallel with the "discharge" resistor.

When power is applied to the heater 14 it is also fed through the feedback transformer into the feedback network. Because of the arrangement of the circuit, these feedback signals will charge the capacitor 51 with a voltage which opposes the output signal of the coupling transformer 12. In other words, the feedback signal opposes the bridge output signal so that the thyratron 13 will conduct only during those periods when the bridge output signal exceeds the feedback signal by an amount equal to the firing potential of the thyratron.

Assume that the sensed temperature is below the desired operating value so that the bridge 11 generates a thyratron triggering pulse, thereby causing the thyratron to conduct and operate the heater 14 at the beginning of a positive half-wave of the A.C. power supply. Power is applied to the feedback circuit simultaneously with the heater. The capacitor 51 begins to charge up through the resistor 50. The voltage across the capacitor 51, which opposes the output signal of the coupling transformer, increases exponentially to a point where the thyratron grid voltage is below its firing potential. When the feedback voltage has reached this point, the thyratron will stop firing on the positive half cycles of the A.C. power supply to disconnect the heater from the power supply. Because of the action of the capacitor 43, the heater 14 is energized continuously until the thyratron is rendered nonconductive by the increasing voltage across the resistor 37.

When the feedback voltage cuts off the thyratron as described above there will no longer be a feedback voltage. The capacitor 51 will then begin to discharge through the resistor 37 and will continue to discharge until the bridge output signal exceeds the capacitor voltage by an amount equal to the thyratron firing potential, whereupon the thyratron will again conduct during postive half cycles of the power supply. Feedback voltage will again be applied. This will cause the capacitor 51 to begin charging, so that the above cycling is continuously repeated until the sensed temperature is up to the desired value.

When the sensed temperature is far below the desired value the bridge signal amplitude will over-ride the feedback signal completely and result in keeping the heat on until the desired temperature is approached. As the desired temperature is reached the output signal of the bridge is reduced and the feedback will start the cycling action to bring the temperature smoothly to the desired value and accurately hold it there.

When the sensed temperature is at or above the desired value, the output of the bridge 11 is such that the thyratron will not be rendered conductive. If, however, the sensed temperature is below the desired operating value, the system functions as above to raise the sensed temperature to the desired value.

From the above description it will be obvious that the heater is continuously cycled on and off when the bridge is signalling that more heat is required. This rapid cycling accurately controls the heat input to the object heated to accurately control its temperature.

It is to be understood that the embodiment disclosed herein is merely illustrative of the invention and that this embodiment may be altered or amended or that numerous other embodiments may be contemplated which will fall within the spirit and scope of the invention.

What is claimed is:

A heater control system; comprising a bridge having therein a thermistor for sensing a temperature and producing a control signal having a magnitude varying with deviations of the sensed temperature from a predetermined value; a thyratron tube having its control grid connected to receive said control signal; an A.C. power supply; a relay connected in series with the thyratron across the power supply and having a plurality of contacts; a heater connected across the power supply in series with said contacts; and a feedback network having therein a first resistor, a capacitor and a diode connected in series across the heater so that when the heater is energized an exponentially increasing feedback signal appears across the capacitor; said feedback network also having a second resistor connected in parallel with the capacitor and in series with and between the bridge and the thyratron control grid so that when the heater is deenergized the capacitor provides an exponentially decreasing feedback voltage across the second resistor, said feedback network being such that the feedback signals are opposite in polarity to the control signal.

References Cited in the file of this patent

UNITED STATES PATENTS

| | | |
|---|---|---|
| 2,838,644 | Rolfson | June 10, 1958 |
| 2,857,104 | Gilbert | Oct. 21, 1958 |
| 2,947,915 | Patchell | Aug. 2, 1960 |
| 2,958,008 | Bray et al. | Oct. 25, 1960 |